United States Patent
Kumar et al.

(10) Patent No.: US 10,815,128 B2
(45) Date of Patent: Oct. 27, 2020

(54) NANOPARTICLES AND METHOD FOR PRODUCING UNIFORM SILICATE-BASED NANOPARTICLES

(71) Applicant: ECOLE POLYTECHNIQUE FEDERALE DE LAUSANNE (EPFL), Lausanne (CH)

(72) Inventors: Abhishek Kumar, Renens (CH); Paul Bowen, Bern (CH)

(73) Assignee: ECOLE POLYTECHNIQUE FEDERALE DE LAUSANNE (EPFL), Lausanne (CH)

(*) Notice: Subject to any disclaimer, the term of this patent is extended or adjusted under 35 U.S.C. 154(b) by 0 days.

(21) Appl. No.: 16/468,665

(22) PCT Filed: Nov. 27, 2017

(86) PCT No.: PCT/IB2017/057423
§ 371 (c)(1),
(2) Date: Jun. 11, 2019

(87) PCT Pub. No.: WO2018/109593
PCT Pub. Date: Jun. 21, 2018

(65) Prior Publication Data
US 2019/0315627 A1 Oct. 17, 2019

(30) Foreign Application Priority Data
Dec. 12, 2016 (EP) .................................. 16203358

(51) Int. Cl.
*C01B 33/26* (2006.01)
*C01B 33/22* (2006.01)
(Continued)

(52) U.S. Cl.
CPC .............. *C01B 33/26* (2013.01); *C01B 33/22* (2013.01); *C01B 33/24* (2013.01); *B82Y 40/00* (2013.01); *C01P 2004/64* (2013.01)

(58) Field of Classification Search
CPC ......... C01B 33/26; C01B 33/22; C01B 33/24; B82Y 40/00; C01P 2004/06
See application file for complete search history.

(56) References Cited

U.S. PATENT DOCUMENTS 6,159,442 A * 12/2000 Thumm ................ B01F 5/0256
239/420

FOREIGN PATENT DOCUMENTS

WO  99/07466  2/1999

OTHER PUBLICATIONS

Teixeira et al. ("Structural and optical characterizations of Ca2Al2SiO7: Ce3+, Mn2+ nanoparticles produced via a hybrid route" Optical Materials, 36(9), 1580-1590. (2014). (Year: 2014).*
(Continued)

*Primary Examiner* — Stanley S Silverman
*Assistant Examiner* — Ricardo D Morales
(74) *Attorney, Agent, or Firm* — Nixon & Vanderhye P.C.

(57) ABSTRACT

Nanoparticles and method for producing uniform silicate-based nanoparticles are disclosed. The method comprises a step of injecting into tubular branched elements comprising static mixers a first aqueous solution comprising a water-soluble silicate compound and a second aqueous solution comprising a water-soluble compound releasing cationic species in solution, and allowing the reaction between the first and the second aqueous solutions in a micro-mixing regime, the method being characterized in that the overall mixing time is kept below $10^{-5}$ s. A further step of allowing the solution obtained in the micro-mixing regime to mix in (Continued)

a macromixing regime. Nanoparticles obtained through the present method are also disclosed.

18 Claims, 2 Drawing Sheets

(51) Int. Cl.
*C01B 33/24* (2006.01)
*B82Y 40/00* (2011.01)

(56) References Cited

OTHER PUBLICATIONS

International Search Report for PCT/IB2017/057423 dated Mar. 27, 2018, 5 pages.
Written Opinion of the ISA for PCT/IB2017/057423 dated Mar. 27, 2018, 8 pages.
Thompson et al., "Amorphous silicate nanoparticles which controlled Fe-Mg pyroxene compositions", Journal of Non-Crystalline Solids, vol. 447, Jun. 22, 2016, pp. 255-261.
Teixeira et al., "Structural and optical characterizations of $Ca_2Al_2SiO_7$: $Ce^{3+}$, $Mn^{2+}$ nanoparticles produced via a hybrid route", Optical Materials, vol. 36, No. 9, May 14, 2014, pp. 1580-1590.
Ishida et al., "Low-Temperature Synthesis of $\beta$-$Ca_2$, $SiO_4$, from Hillebrandite", Journal of the American Ceramic Society, vol. 75, No. 9, Sep. 1, 1992, pp. 2427-2432.
Saunders et al., "A photo-chemical method for the production of olivine nanoparticles as cosmic dust analogues", ICARUS, vol. 212, No. 1, Dec. 18, 2010, pp. 373-382.

\* cited by examiner

NANOPARTICLES AND METHOD FOR PRODUCING UNIFORM SILICATE-BASED NANOPARTICLES

This application is the U.S. national phase of International Application No. PCT/IB2017/057423 filed Nov. 27, 2017 which designated the U.S. and claims priority to EP Patent Application No. 16203358.3 filed Dec. 12, 2016, the entire contents of each of which are hereby incorporated by reference.

TECHNICAL FIELD

The invention pertains to the field of powders or nanoparticles and methods for obtaining such products.

BACKGROUND ART

Precipitation, also called reactive crystallization, is one of the ways of producing pure phases of crystals or particles and is one of the most widely used industrial separation processes. It finds itself in an important place in pharmaceutical applications, where over 70% of the product passes through the particle/powder phase at least once.

Silicon occurs in group IVA of the periodic table, and like all non-transition elements, tends to almost exclusively form four co-ordinate compounds with tetrahedral geometry. The most commonly observed example of silicon in this geometry is the ortho-silicate anion ($SiO^{4-}$) which is the building block of all silica's and silicates. Due to silicon being significantly less electronegative than oxygen, the Si—O bond is intermediate in character between ionic and covalent. Since Pauling (1929) put forward that the Si—O bond is approximately 50% covalent and 50% ionic in character, there has been an ongoing debate as to whether the bond is predominantly ionic or covalent. Nevertheless, as ionic bonding is non-directional, the partially ionic character of the bond allows for more variation of bond angles for Si—O—Si siloxane linkages with a soft bending potential at the oxygen atom. The flexibility of the Si—O—Si linkage, in combination with the different degrees of connectivity between the ($SiO^{4-}$) tetrahedral building blocks, leads to a wide variety of silicate structures that can be formed in combination with atoms like calcium, magnesium, aluminium, zinc or iron. The phase formation is dependent on the silicate species and silicate species is highly dependent on pH value.

Precipitation processes are often conducted in batch, where it is nearly impossible to avoid localization (i.e., to have good composition homogeneity), resulting in formation of wide range of particle size distribution and morphologies, and rendering the physical scaling up a tedious and struggling process. Furthermore, also in precipitation reactions performed in continuous tubular flow reactors, parabolic flows are generated therein, resulting in similar disadvantages as those mentioned for batch reactors, as well as an expensive product loss and the possibility of clogging of tubular elements.

It is therefore evident that scale-up in chemical engineering is frequently a very difficult task, as a variety of factors can influence the quantity and quality of the final product of a process. Hence, successful scale-up requires the utilization of a wide range of technical skills and thorough understanding of the problem under study, and both technical and economic aspects have to be taken into account. Time and money can thus restrict the scale-up procedure, while calculated risks have to be taken in design and construction. For many processes, such as precipitation, there is a lack of understanding as to what role certain physical and chemical processes play in scale-up, and so they are scaled up empirically or by a trial and error approach. Generally speaking, scale up ratio can be defined as Scale up ratio=(Aimed-scale production rate)/(Existing-scale production rate)

and it falls usually within a range from 10 to 1000 for scale-up from laboratory scale to the pilot plant unit, and within a range from 10 to 1500 for scale-up from pilot plant units to commercial plants, depending on the process and system involved.

SUMMARY OF INVENTION

The aim of the present invention is to obviate to three main problems experienced during a scale-up production of inorganic powders: firstly, the problem of maintaining a required or consistent condition of the chemical species needed to form uniform precipitated particles in a uniform precipitation reaction; secondly, the issue of mitigating the disadvantage of the mixing conditions in a batch reactor, in order to avoid non-uniform particle formation; and lastly, the issue of avoiding the disadvantages caused by the parabolic flow condition in a large-scale continuous powders/particles production, to reduce as much as possible product losses and avoid cross contamination.

The inventors came up, after extensive research efforts, to a precise process to overcome the above-mentioned problems, as well as to a new design for a reactor useful for implementing said process. In particular, in an implemented embodiment, the method of the present invention provides for a well-controlled process for the production of highly uniform silicate-based powders. These are obtained by precipitation of the nanoparticles composing them from a liquid reaction mixture comprising water-soluble inorganic species and water-soluble silicate compounds, in alkaline conditions and in a micro-mixing or very-low mixing regime.

It is therefore an object of the present invention to provide a method for producing uniform silicate-based nanoparticles, comprising the following steps:

a) providing a first aqueous solution comprising a water-soluble silicate compound and a second aqueous solution comprising a water-soluble compound releasing cationic species in solution; and b) allowing the reaction between the first and the second aqueous solutions in a micro-mixing regime;

characterized in that the overall mixing time is kept below $10^{-5}$ s.

In one embodiment, the method is carried out at a pH comprised between 7 and 14, preferably between 9 and 14, more preferably between 11 and 14.

In preferred embodiments, the micro-mixing step is performed through the passage of the first and the second aqueous solutions into a branched tubular structure comprising static mixing elements, wherein the first and the second aqueous solution mix at a connection point between the branches.

In one embodiment, the sum of the flow-rates of the first and the second aqueous solution into the branches of the tubular structure is comprised between 30 and 45 ml/min, preferably between 32 and 40 ml/min.

In one embodiment, the branches of the tubular structure have a relative orientation angle comprised between 30° and 180°, such as between 30° and 75°.

In one embodiment, the method further comprises a step c) of allowing the solution obtained in the micro-mixing regime to mix in a macro-mixing regime.

In one embodiment, the overall mixing time is between 2 and 3 orders of magnitude higher than the interval between step b) and step c).

In one embodiment, the macro-mixing step is performed into a batch reactor under stirring conditions.

In one embodiment, the first aqueous solution comprises a water soluble silicate compound is selected from the list comprising sodium silicate, calcium silicate, potassium silicate, water glass, di-calcium silicate, tri-calcium silicate, silic acid, sodium metasilicate, potassium metasilicate or any combination thereof.

In one embodiment, the second aqueous solution comprises a water soluble calcium compound, a water soluble zinc compound, a water soluble iron compound, a water soluble magnesium compound, a water soluble aluminium compound or any combination of the foregoing.

In one embodiment, the relative amounts of calcium, zinc, iron, silicium, magnesium and aluminium in each of the used water soluble compounds are provided according to Table 1.

In one embodiment, the water soluble calcium compound is selected from the list comprising calcium bromide, calcium carbonate, calcium nitrate, calcium formate, calcium bicarbonate, calcium borate, calcium sulphide, calcium tartrate, di-calcium silicate, tri-calcium silicate, calcium chlorate, calcium iodide, calcium aluminate, calcium phosphate, calcium propionate, calcium oxide, calcium phosphate tribasic, calcium phosphate dibasic dehydrate, calcium phosphate dibasic anhydrous, calcium glycerophosphate, preferably calcium chloride, calcium stearate, calcium gluceptate, calcium gluconate or calcium acetate, or any combination of the foregoing.

In one embodiment, the water soluble zinc compound is selected from the list comprising zinc bromide, zinc carbonate, zinc nitrate, zinc formate, zinc bicarbonate, zinc borate, zinc sulphide, zinc tartrate, di-zinc silicate, tri-zinc silicate, zinc chlorate, zinc iodide, zinc aluminate, zinc phosphate, zinc propionate, zinc oxide, zinc phosphate tribasic, zinc phosphate dibasic dehydrate, zinc phosphate dibasic anhydrous, zinc glycerophosphate, preferably zinc acetate, zinc chloride, zinc gluconate, zinc gluceptate or zinc stearate, or any combination of the foregoing.

In one embodiment, the water soluble iron compound is selected from the list comprising iron bromide, iron carbonate, iron nitrate, iron formate, iron bicarbonate, iron borate, iron sulphide, iron tartrate, di-iron silicate, tri-iron silicate, iron chlorate, iron iodide, iron aluminate, iron stearate, iron phosphate, iron propionate, iron oxide, iron phosphate tribasic, iron phosphate dibasic dehydrate, iron phosphate dibasic anhydrous, iron glycerophosphate, preferably iron acetate, iron chloride, iron gluconate, iron gluceptate or iron stearate, or any combination of the foregoing.

In one embodiment, the water soluble magnesium compound is selected from the list comprising magnesium bromide, magnesium carbonate, magnesium nitrate, magnesium formate, magnesium bicarbonate, magnesium borate, magnesium sulphide, magnesium tartrate, di-magnesium silicate, tri-magnesium silicate, magnesium chlorate, magnesium iodide, magnesium aluminate, magnesium stearate, magnesium phosphate, magnesium propionate, magnesium oxide, magnesium phosphate tribasic, magnesium phosphate dibasic dehydrate, magnesium phosphate dibasic anhydrous, magnesium glycerophosphate, preferably magnesium acetate, magnesium chloride, magnesium gluconate, magnesium gluceptate or magnesium stearate, or any combination of the foregoing.

In one embodiment, the water soluble aluminium compound is selected from the list comprising aluminium bromide, aluminium carbonate, aluminium nitrate, aluminium formate, aluminium bicarbonate, aluminium borate, aluminium sulphide, aluminium tartrate, di-aluminium silicate, tri-aluminium silicate, aluminium chlorate, aluminium iodide, aluminium aluminate, aluminium stearate, aluminium phosphate, aluminium propionate, aluminium oxide, aluminium phosphate tribasic, aluminium phosphate dibasic dehydrate, aluminium phosphate dibasic anhydrous, aluminium glycerophosphate, preferably aluminium acetate, aluminium chloride, aluminium gluconate, aluminium gluceptate or aluminium stearate, or any combination of the foregoing.

In one embodiment, the solution obtained in the micro-mixing step is kept in low carbon conditions, typically lower than 100 parts per million.

Another object of the present invention relates to the nanoparticles obtained through the previously described method, characterized in that said nanoparticles have a uniformity of up to 99.9%.

In a preferred embodiment, said nanoparticles are characterized in that, in each nanoparticle, the ratio between an atom derived from a cationic species and silicon is comprised between 1.6 and 2.25.

DESCRIPTION OF EMBODIMENTS

Figure 1:
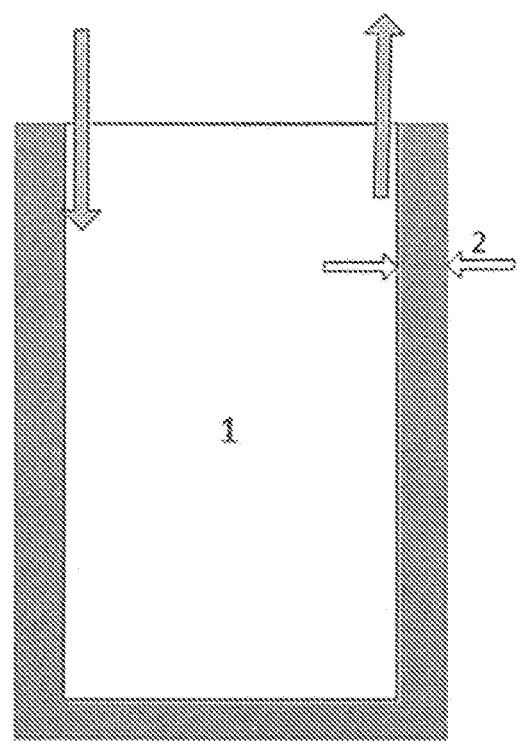
FIG. 1 depicts one embodiment of a suitable batch reactor for performing the mixing step in a macro-mixing regime.

The present disclosure may be more readily understood by reference to the following detailed description presented in connection with the accompanying drawing figures, which form a part of this disclosure. It is to be understood that this disclosure is not limited to the specific conditions or parameters described and/or shown herein, and that the terminology used herein is for the purpose of describing particular embodiments by way of example only and is not intended to be limiting of the claimed disclosure.

As used herein and in the appended claims, the singular forms "a", "an" and "the" include plural referents unless the context clearly dictates otherwise. Thus, for example, reference to "a nanoparticle" may include a plurality of such nanoparticles and reference to "a compound" includes reference to one or more compounds, and so forth.

Also, the use of "or" means "and/or" unless stated otherwise. Similarly, "comprise", "comprises", "comprising", "include", "includes" and "including" are interchangeable and not intended to be limiting. It is to be further understood that where descriptions of various embodiments use the term "comprising", those skilled in the art would understand that in some specific instances, an embodiment can be alternatively described using language "consisting essentially of" or "consisting of."

The presently developed method is intended for the production on medium or large scale of nanopowders, i.e. a solid composed of a plurality of very fine nanosized particles that are not cemented together and may flow freely. Powders are used in many industrial processes and for diverse applications, spanning from architectural and painting applications to additive manufacturing, automotive industry, surface coating, as fillers or for preparing pharmaceutical, nutraceutical or food formulations. For many of these applications, it is crucial that the used powders are homogeneous and uniform in terms of size, shape, chemistry or combinations thereof. This uniformity can result in a more homogeneous final product, a linear release of a chemical/biological for a formulation, more complaint product from batch to batch and so forth. One of the scope of the present invention was to obviate to the intrinsic heterogeneity of the particles composing a powder that is usually retrieved at the end of a manufacturing process, in order to obtain uniform nanoparticles in terms of size, shape and/or chemistry thereof with an extremely high confidence.

In particular, the nanoparticles produced according to the present invention are silicate-based nanoparticles, in which a silicate anion is combined with cationic species. Those cationic species are typically released upon dissolution in an aqueous medium of water-soluble compounds. According to the present invention, typically used water soluble compounds releasing in solution cationic species are calcium compounds, zinc compounds, iron compounds, magnesium compounds, aluminium compounds or any combination of the foregoing, thus releasing in solution calcium, zinc, iron, magnesium or aluminium cationic species.

The silicate anionic species can derive from a water soluble silicate compound selected from the non-exclusive list comprising sodium silicate, calcium silicate, potassium silicate, water glass, di-calcium silicate, tri-calcium silicate, silic acid, sodium metasilicate, potassium metasilicate or any combination thereof.

In one embodiment, the water soluble calcium compound is selected from the non-exclusive list comprising calcium bromide, calcium carbonate, calcium nitrate, calcium formate, calcium bicarbonate, calcium borate, calcium sulphide, calcium tartrate, di-calcium silicate, tri-calcium silicate, calcium chloride, calcium iodide, calcium aluminate, calcium phosphate, calcium propionate, calcium oxide, calcium phosphate tribasic, calcium phosphate dibasic dehydrate, calcium phosphate dibasic anhydrous, calcium glycerophosphate, preferably calcium chloride, calcium stearate, calcium gluceptate, calcium gluconate or calcium acetate, or any combination of the foregoing.

In one embodiment, the water soluble zinc compound is selected from the non-exclusive list comprising zinc bromide, zinc carbonate, zinc nitrate, zinc formate, zinc bicarbonate, zinc borate, zinc sulphide, zinc tartrate, di-zinc silicate, tri-zinc silicate, zinc chloride, zinc iodide, zinc aluminate, zinc phosphate, zinc propionate, zinc oxide, zinc phosphate tribasic, zinc phosphate dibasic dehydrate, zinc phosphate dibasic anhydrous, zinc glycerophosphate, preferably zinc acetate, zinc chloride, zinc gluconate, zinc gluceptate or zinc stearate, or any combination of the foregoing.

In one embodiment, the water soluble iron compound is selected from the non-exclusive list comprising iron bromide, iron carbonate, iron nitrate, iron formate, iron bicarbonate, iron borate, iron sulphide, iron tartrate, di-iron silicate, tri-iron silicate, iron chlorate, iron iodide, iron aluminate, iron stearate, iron phosphate, iron propionate, iron oxide, iron phosphate tribasic, iron phosphate dibasic dehydrate, iron phosphate dibasic anhydrous, iron glycerophosphate, preferably iron acetate, iron chloride, iron gluconate, iron gluceptate or iron stearate, or any combination of the foregoing.

In one embodiment, the water soluble magnesium compound is selected from the non-exclusive list comprising magnesium bromide, magnesium carbonate, magnesium nitrate, magnesium formate, magnesium bicarbonate, magnesium borate, magnesium sulphide, magnesium tartrate, di-magnesium silicate, tri-magnesium silicate, magnesium chlorate, magnesium iodide, magnesium aluminate, magnesium stearate, magnesium phosphate, magnesium propionate, magnesium oxide, magnesium phosphate tribasic, magnesium phosphate dibasic dehydrate, magnesium phosphate dibasic anhydrous, magnesium glycerophosphate, preferably magnesium acetate, magnesium chloride, magnesium gluconate, magnesium gluceptate or magnesium stearate, or any combination of the foregoing.

In one embodiment, the water soluble aluminium compound is selected from the non-exclusive list comprising aluminium bromide, aluminium carbonate, aluminium nitrate, aluminium formate, aluminium bicarbonate, aluminium borate, aluminium sulphide, aluminium tartrate, di-aluminium silicate, tri-aluminium silicate, aluminium chlorate, aluminium iodide, aluminium aluminate, aluminium stearate, aluminium phosphate, aluminium propionate, aluminium oxide, aluminium phosphate tribasic, aluminium phosphate dibasic dehydrate, aluminium phosphate dibasic anhydrous, aluminium glycerophosphate, preferably aluminium acetate, aluminium chloride, aluminium gluconate, aluminium gluceptate or aluminium stearate, or any combination of the foregoing.

The advent of total quality programs in the powder processing industry has resulted in considerable evidence that subtle variations in the powder production process reflect changes in powder characteristics. This realization suggests the importance of producing uniform powders, characterized by high purity and compositional homogeneity. This requires in situ diagnosis of product quality during powder production. Further, there is increased need for smaller powders for applications such as injection molding and microelectronics. As powders become smaller, handling problems increase, often leading to contaminated powder and high scrap generation. Thus, research on powder production must be closely coupled with studies on properties, processing, and handling concerns.

Plasma processing, reactive synthesis, mechanical alloying, chemical precipitation, and gas atomization techniques are being applied to the generation of novel powders, especially fine powders produced from reactive or refractory materials. The use of plasma techniques for the generation of uniform micrometer-sized powders is an exciting development. Mechanical alloying is recognized for its key role in the fabrication of dispersion-strengthened alloys and amorphous alloys. Powders fabricated using atomization techniques include most of the high-performance alloys (e.g., superalloys and titanium alloys).

Chemical precipitation techniques have demonstrated unique abilities to form small, uniform powders, but much effort is needed to scale-up these approaches to viable production quantities. Near-term research efforts need to focus on production of large quantities of small powders to identify potential scale-up difficulties. Considerable recent research attention has been directed to the generation of coated powders. Coatings are formed by electrolysis, chemical vapor/physical vapor, fluid bed, spouted bed, and mechanical deposition techniques. This technology represents engineering at the individual particle level, forming coated particulates. These coated powders create opportunities at the microlevel to engineer improved processing and homogeneity.

In this context, one major achievement of the presently disclosed method relates to the uniformity of the obtained nanoparticles, which results from the tailoring of the mixing conditions of the precursor compounds. In this regard, a uniformity of ≥99.9% can be achieved with mixing time≥$10^3$×drop interval time, wherein "drop interval time" is herein defined as the time interval between each drop of aqueous solution(s) entering into the system for mixing. As it will be evident, this factor is function of the used flow rate; the higher the flow rate, the lower the drop interval time. Overall, the aim of the method is to ensure that each incoming drop enters into the system in the same way as any previous drop. To do so, all previous feed drop should be well mixed and reacted to form a new phase, so that any incoming drop is not physically or chemically altered by the already existing same reactant from previous drops.

As used herein, the term "uniform" when used with reference to the nanoparticles of the invention, relates to homogeneity in terms of physical and/or chemical characteristics. In particular, the nanoparticles obtained according to the method of the present invention are intrinsically uniform, i.e. have a homogeneous distribution of the cationic and anionic inorganic species within the particle itself and have the same proportions of its components throughout the particle, and are uniform among them, i.e. taken a plurality of nanoparticles, they result homogenous in terms of size, shape and chemical species composing them. With this regard, the term uniform relates to a homogeneity of more than 95%, such as 96, 97, 98, 99 or even more up to 99.9%.

Still a further breakthrough achievement of the present invention relates to the ratio between an atom derived from a cationic species and the silicon within each obtained nanoparticle, which for the sake of easiness will be herein referred to as "[X/Si] ratio". What the inventors proved able to obtain with the developed method is a new kind of nanopowder wherein each nanoparticle can reach a [X/Si] ratio comprised between 1.6 and 2.25, a ratio that has never been obtained before despite several attempts in this sense. Generally speaking, the obtained silicate nanoparticles can have in some embodiments a mean size comprised between about 10 and 100 nm, preferably between about 30 and 40 nm.

According to the present method, a first aqueous solution comprising a water-soluble silicate compound is allowed to mix and to react with a second aqueous solution comprising a water-soluble compound releasing cationic species in solution, as those previously listed. As used herein, an "aqueous solution" is a solution in which the solvent is substantially made of water. In the frame of the present disclosure, the term "aqueous" means pertaining to, related to, similar to, or dissolved in water. Any water-soluble compound having an adequate solubility/reactivity in water, e.g. a compound for which at least 50% of the solid species can be dissolved in the water as solvent, can be a suitable candidate for any of the above-mentioned species. Said species are preferably provided in the form of nanoparticles having a mean size comprised between about 50 nm and about 1000 micrometers, which are homogeneously dispersed within the final composition.

The first and the second aqueous solutions are allowed to mix in a micro-mixing regime, that is, a kind of mixing which takes place at molecular scale and that promotes a so-called reactive mixing, a process where mixing and chemical reactions can occur simultaneously thanks to dynamic environment renovation around each molecule, that in turn favours the contact of the reactive elements at the microscopic or molecular scales. The main feature of the micro-mixing regime according to the present invention is the fact that the overall mixing time is kept below $10^{-5}$ seconds in order to create the perfect environment and reaction time to produce the sought nanoparticles.

In some preferred embodiments, said micro-mixing step is performed through the passage of the first and the second aqueous solutions into a branched tubular structure comprising static mixing elements, wherein the first and the second aqueous solution mix at a connection point between the branches. The structure of the mixing element can be spiral-shaped, based on intersecting channels. In one embodiment, four mixing elements of 1200 to 1800 microns length are inserted into a 600 to 1200 microns diameter tube, preferably 900 to 1200 microns. Each mixing element is made of 24 rectangular bars placed at ±45° that form intersecting channels. The mixing elements are arranged in the tubular structure so that each element can be generated by a reflection and a 90° rotation of its neighbour.

The diameter to length ratio of the mixing element can vary from 0.001 to 0.20, preferably 0.001 to 0.16, more preferably 0.001 to 0.008. The mixing time in laminar regime can be calculated by the slab diffusion model and can have mean shear deformation rate in the tube from 0.005 to 5. The power dissipation in w/kg can be 0.1 to 10000.

Figure 3:
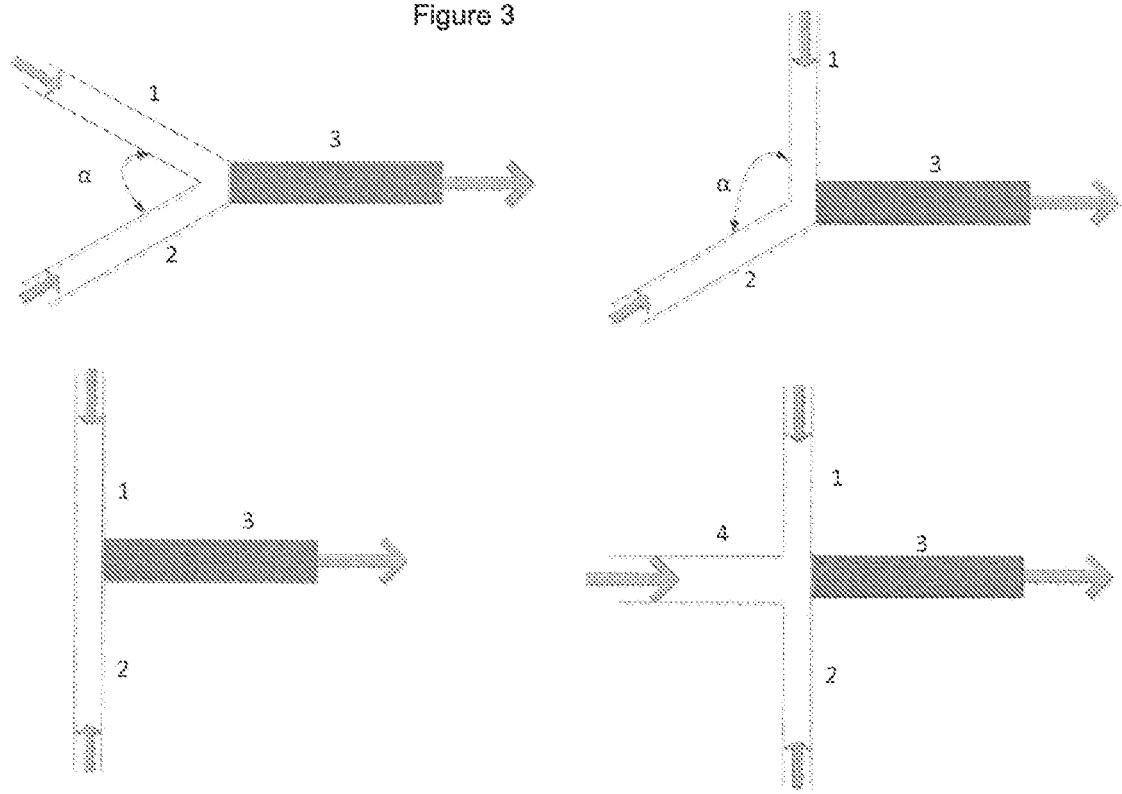
FIG. 3 depicts the branched micromixing tubular element comprising static mixing structures and the relative angles between the various branches adapted to perform the method of the invention.

In one embodiment, the branches of the tubular structure have a relative orientation angle comprised between 30° and 180°, such as between 30° and 75°. As shown in FIG. 3 a) to c), items 1 and 2 represents the inlet branches of the tubular structure used to inject the first aqueous solution and the second aqueous solution, preferably in highly alkaline conditions such as at pH comprised between 7 and 14, preferably between 9 and 14 and even more preferably between 11 and 14. Item 3 represents the mixing zone of the reacting volume, that is, the outlet of the tubular structure. The angle of interaction of reacting volume a can vary between 30° and 180°, such as between 30° and 75° in a particular embodiment. The angle of interaction varies inversely to the sum of the flowrate of the solutions flowing into branches 1 and 2. In one embodiment, the sum of the flow-rates of the first and the second aqueous solutions into the branches of the tubular structure is comprised between 30 and 45 ml/min, preferably between 32 and 40 ml/min.

Since morphology and uniform particle size distribution of silicate-based nanoparticles is greatly dependent on the type of silicate species available in the solution, and this is in turn dependent on pH value, it is vital to tightly regulate the pH along the reaction pathway. As shown in FIG. 3d), a further inlet 4 can be designed to control the pH value by e.g. introducing basic aqueous solutions such as solutions comprising calcium, zinc, magnesium and/or iron hydroxides or chlorides. The insurance of consistent pH conditions for reaction volume can be in some embodiments further guaranteed by the passage of a flow of nitrogen, argon or even in vacuum conditions in order to keep low carbon conditions, typically lower than 100 parts per million. For instance, a nitrogen flow kept at 10 ml/min to 50 ml/min, preferably 10 ml/min to 30 ml/min can be used. For "reaction volume" is herein meant the volume of silicate solution and the volume of the reacting cationic solution introduced in the reactor per unit time in drop-wise or continuous addition.

In FIG. 3a) to c), the ratio of the radius of branch 1 and branch 2 to branch 3 can be comprised between 0.8 to 1.4, respectively. More preferably, the ratio of the radius of branch 1 and branch 2 to branch 3 varies between 0.9 to 1.2. In FIG. 3d), the ratio of branch 4 to the sum of radius of branches 1, 2 and 3 lies between 0.21 to 0.38.

The power dissipation in the preferred embodiments are given by Hagen-Posuissle equations and can vary between 0.1 to 5000 w/kg. In the presented first stage of micro-mixing, as described by Kashid et. al., (Microstructured Devices for Chemical Processing ISBN 978-3-527-33128-4—Wiley-VCH, Weinheim, first edition 2014), the mixing time in the described stage can be calculated based on the power consumption in the static mixer governed empirically by $0.15/\varepsilon^{0.45}$ or $0.45/\varepsilon^{1.95}$, where $\varepsilon$ is the total power (Watts/kg) imparted to pass the liquid through the static mixture only. The mixing time calculation and the Damkohler number is calculated for each flow rate and is adapted in accordance with Shinji Nagata, "Mixing—Principle and applications" ISBN 0-470-62863-4—Kodansha ltd., First edition 1975.

As previously stated, the first aqueous solution comprises water soluble silicate compounds and a second aqueous solution comprises water soluble compounds releasing in solution cationic species. Those compounds can be preferably calcium compounds, zinc compounds, iron compounds, magnesium compounds, aluminium compounds or any combination of the foregoing. In a preferred embodiment according to the method of the invention, the relative amounts of calcium, zinc, iron, silicon, magnesium and aluminum in each of the used water soluble compounds are provided according to Table 1.

TABLE 1

Preferred relative components' amounts in mol %

| Ca | 0.1 to 11 | Preferably | 0.1 to 9 | More Preferably | 0.1 to 7 |
|----|-----------|------------|----------|-----------------|----------|
| Zn | 0 to 10 | Preferably | 0 to 6 | More Preferably | 0 to 5 |
| Fe | 0 to 10 | Preferably | 0 to 6 | More Preferably | 0 to 5 |
| Si | 0.1 to 22 | Preferably | 0.1 to 18 | More Preferably | 0.1 to 10 |
| Mg | 0.1 to 2 | Preferably | 0.1 to 1.8 | More Preferably | 0.1 to 1.5 |
| Al | 0.1 to 2 | Preferably | 0.1 to 1.8 | More Preferably | 0.1 to 1.5 |

According to one embodiment of the invention, the method further comprises a step of allowing the solution obtained in the micro-mixing regime to mix in a macro-mixing regime. The term "macromixing" relates to the process of mixing at the macroscopic scale, i.e. on the scale of the whole container or reservoir containing a solution, and corresponds to the large-scale flow processes that cause the occurrence of large-scale distributions such as the distribution of mean concentration. In one embodiment, the macro-mixing step is performed into a batch reactor under stirring conditions. As it will be apparent, in this embodiment of the invented method two mixing steps are used, and the reacting volume passes through both of them. Importantly, the overall mixing time in this two-stage mixing is between 2 and 3 orders of magnitude higher than the interval between the micro-mixing step and the macro-mixing step.

FIG. 1 depicts one embodiment of a suitable batch reactor for performing the mixing step in a macro-mixing regime. The reactor is cylindrical in shape, and can be made up of any suitable material that withstand extreme pH conditions such as PMMA, PTFE, PE, PO and the like. The thickness of the reactor can be comprised between 0.1 and 20, preferably between 0.5 and 10 cm. The ratio between the inner diameter and the length of the reactor can vary between 0.1 and 10, preferably between 0.1 and 3.8, more preferably between 1 and 3. FIG. 1 schematically depicts the input and the output of a nitrogen flow, wherein 1 is the total volume of the reactor and 2 represents the volume of the material composing the same. The ratio between the volume of the reactor and the volume of material can be comprised between 0.06 and 3, preferably between 0.05 and 2.

Figure 2:
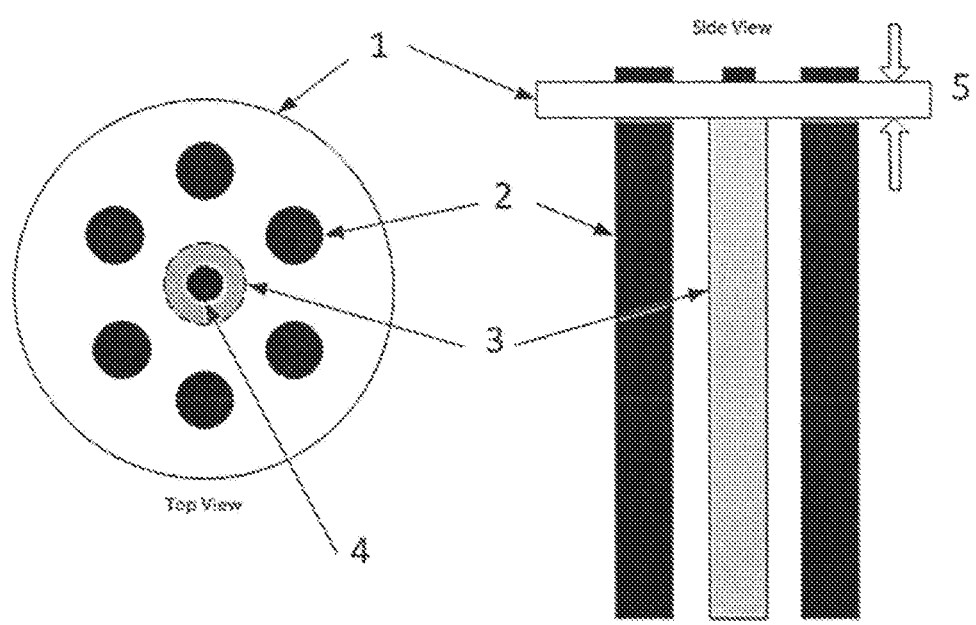
FIG. 2 depicts one embodiment of a suitable batch reactor, said reactor comprising cylindrical baffle elements and a special baffle arrangement comprising a micromixing unit.

In the depicted, non-limiting embodiment, the reactor can comprise 4 to 12 cylindrical baffles evenly distributed and spaced to each other, introduced into the reactor from its top surface. The ratio of diameter of the baffles to the inner diameter of the reactor can vary from 0.0006 to 0.01, preferably from 0.08 to 0.01. In FIG. 2, 1 represents the lid of the reactor, 2 represents the hollow or solid cylindrical baffles, and 3 represents a special baffle arrangement into which a micromixing unit is mounted. In some embodiments, hollow baffles contain ion selective electrodes for reaction state monitoring.

Figure 4:
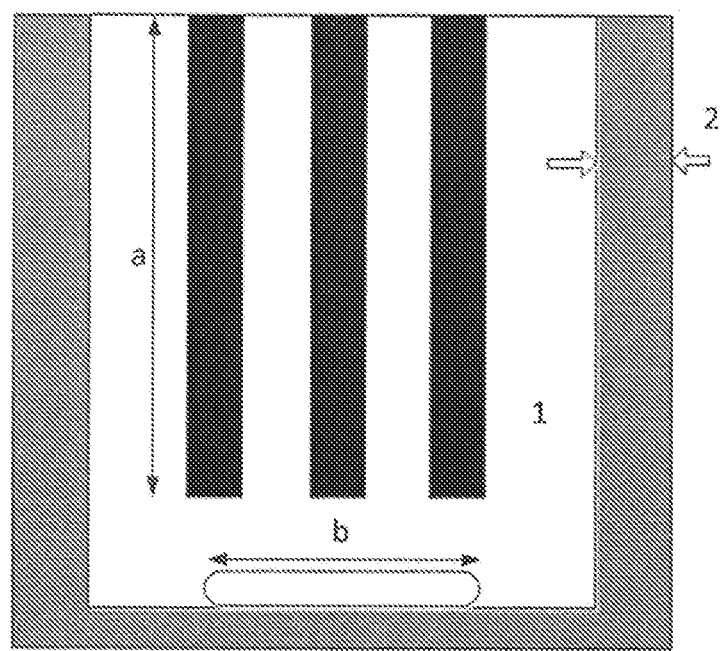
FIG. 4 depicts one embodiment of a suitable batch reactor comprising baffle elements and a magnetic stirrer for performing the active macromixing step of the method according to the invention.

In some preferred embodiments, as depicted in FIG. 4, the second macro-mixing stage is performed in the reactor under magnetic stirring conditions, which can be performed at a speed comprised for instance between 600 rpm and 1800 rpm. The calculated Damkohler number is maintained going from the first micro-mixing stage to macro-mixing condition. In the current invention, the mixing time is governed by total power consumed required keeping the liquid in circular motion and the power needed to overcome the shear in the reacting liquid. In FIG. 4, the ratio of the length of circular baffles or the ion selective electrodes <a>, and the diameter of the magnetic stirrer <b>, is maintained between 2.5 and 0.5, more preferably between 2 and 0.75.

The power needed would depend on the Newton number for a given flow rate from the micro-mixing tubular structure into the batch reactor. Separate Newton number is calculated for shearing and for liquid in circular motion from empirical relationships.

In preferred embodiments, the Newton number is empirically calculated based on the number of baffles and their dimensions. The flow rate governs the reacting volume in the first stage micro-mixing and interval between each drop into the reactor for the second mixing stage. Importantly, the overall mixing achieved during the two stages should be kept below $10^{-5}$, preferably between $10^{-9}$ and $10^{-6}$, with a mixing time higher than that of interval between the two mixing stages, but lower than the precipitating reaction.

The passage along the tubular branched structure of a segmented reaction flow can also be comprised of discrete volumes of the reaction mixture separated by discrete volumes of a separating fluid that is substantially immiscible with said reaction mixture, the residence time of said discrete volumes of reaction mixture in the reactor being sufficient for the precipitation reaction to be effected.

The mixing condition is monitored in the reactor by ion selective electrode and the pH measurement in the preferred embodiment. The concentration of the cation in the current invention is close to the solubility equilibrium value for the cation for the entire precipitation reaction. Alkalinity of the reacting volume can be equally maintained by sodium hydroxide or potassium hydroxide being pre-fed into the reactor.

The current reactor model can be integrated to other unit operation process in continuous mode for phase separations and precipitations or reactive crystallisation.

The method of the present invention can provide for scale-up ratio comprised between 1 and 1200, preferably between 5 and 999, more preferably between 15 and 900.

The invention claimed is:

1. A method for producing uniform silicate-based nanoparticles, comprising the following steps:
    a) providing a first aqueous solution comprising a water-soluble silicate compound and a second aqueous solution comprising a water-soluble compound releasing cationic species in solution;
    b) allowing the reaction between the first and the second aqueous solution in a micro-mixing regime; and
    c) allowing the solution obtained in the micro-mixing regime to mix in a macro-mixing regime, the macro-mixing regime performed in a batch reactor under stirring conditions,
    wherein the overall mixing time for the micro-mixing regime and the macro-mixing regime is kept below $10^{-5}$ s.

2. The method of claim 1, wherein a pH value of the reaction volume is between 7 and 14.

3. The method of claim 1, wherein the micro-mixing step is performed through the flow of the first and the second aqueous solutions into a branched tubular structure comprising static mixing elements, wherein the first and the second aqueous solution mix at a connection point between the branches.

4. The method of claim 3, wherein the sum of the flow-rates of the first and the second aqueous solution flowing into the branches of the tubular structure is comprised between 30 and 45 ml/min.

5. The method of claim 3, wherein the branches of the tubular structure have a relative orientation angle comprised between 30° and 180°.

6. The method of claim 1, wherein the overall mixing time is between two and three orders of magnitude higher than the interval between step b) and step c).

7. The method of claim 1, wherein the first aqueous solution comprises a water soluble silicate compound selected from the list comprising sodium silicate, calcium silicate, potassium silicate, water glass, di-calcium silicate, tri-calcium silicate, silic acid, sodium metasilicate, potassium metasilicate or any combination thereof.

8. The method of claim 1, wherein the second aqueous solution comprises a water soluble calcium compound, a water soluble zinc compound, a water soluble iron compound, a water soluble magnesium compound, a water soluble aluminium compound or any combination of the foregoing.

9. The method of claim 8, wherein the relative amount of calcium is between 0.1 to 11 mol %, the relative amount of zinc is between 0 to 10 mol %, the relative amount of iron is between 0 to 10 mol %, the relative amount of silicium is between 0.1 to 22 mol %, the relative amount of magnesium is between 0.1 to 2 mol %, and the relative amount of aluminium is between 0.1 to 2 mol % in each of the used water soluble compounds.

10. The method of claim 8, wherein the water soluble calcium compound is selected from the list comprising calcium bromide, calcium carbonate, calcium nitrate, calcium formate, calcium bicarbonate, calcium borate, calcium sulphide, calcium tartrate, di-calcium silicate, tri-calcium silicate, calcium chlorate, calcium iodide, calcium aluminate, calcium phosphate, calcium propionate, calcium oxide, calcium phosphate tribasic, calcium phosphate dibasic dehydrate, calcium phosphate dibasic anhydrous, calcium glycerophosphate, calcium stearate, calcium gluceptate, calcium gluconate or calcium acetate, or any combination of the foregoing.

11. The method of claim 8, wherein the water soluble zinc compound is selected from the list comprising zinc bromide, zinc carbonate, zinc nitrate, zinc formate, zinc bicarbonate, zinc borate, zinc sulphide, zinc tartrate, di-zinc silicate, tri-zinc silicate, zinc chlorate, zinc iodide, zinc aluminate, zinc phosphate, zinc propionate, zinc oxide, zinc phosphate tribasic, zinc phosphate dibasic dehydrate, zinc phosphate dibasic anhydrous, zinc glycerophosphate, zinc chloride, zinc gluconate, zinc gluceptate or zinc stearate, or any combination of the foregoing.

12. The method of claim 8, wherein the water soluble iron compound is selected from the list comprising iron bromide, iron carbonate, iron nitrate, iron formate, iron bicarbonate, iron borate, iron sulphide, iron tartrate, di-iron silicate, tri-iron silicate, iron chlorate, iron iodide, iron aluminate, iron stearate, iron phosphate, iron propionate, iron oxide, iron phosphate tribasic, iron phosphate dibasic dehydrate, iron phosphate dibasic anhydrous, iron glycerophosphate, iron chloride, iron gluconate, iron gluceptate or iron stearate, or any combination of the foregoing.

13. The method of claim 8, wherein the water soluble magnesium compound is selected from the list comprising magnesium bromide, magnesium carbonate, magnesium nitrate, magnesium formate, magnesium bicarbonate, magnesium borate, magnesium sulphide, magnesium tartrate, di-magnesium silicate, tri-magnesium silicate, magnesium chlorate, magnesium iodide, magnesium aluminate, magnesium stearate, magnesium phosphate, magnesium propionate, magnesium oxide, magnesium phosphate tribasic, magnesium phosphate dibasic dehydrate, magnesium phosphate dibasic anhydrous, magnesium glycerophosphate, magnesium chloride, magnesium gluconate, magnesium gluceptate or magnesium stearate, or any combination of the foregoing.

14. The method of claim 8, wherein the water soluble aluminium compound is selected from the list comprising aluminium bromide, aluminium carbonate, aluminium nitrate, aluminium formate, aluminium bicarbonate, aluminium borate, aluminium sulphide, aluminium tartrate, di-aluminium silicate, tri-aluminium silicate, aluminium chlorate, aluminium iodide, aluminium aluminate, aluminium stearate, aluminium phosphate, aluminium propionate, aluminium oxide, aluminium phosphate tribasic, aluminium phosphate dibasic dehydrate, aluminium phosphate dibasic anhydrous, aluminium glycerophosphate, aluminium chloride, aluminium gluconate, aluminium gluceptate or aluminium stearate, or any combination of the foregoing.

15. The method of claim 1, wherein the solution obtained in the micro-mixing step is kept in low carbon conditions that is lower than 100 parts per million.

16. Nanoparticles obtained through the method of claim 1, wherein they have a uniformity of up to 99.9%.

17. Nanoparticles obtained through the method of claim 1, wherein, in each nanoparticle, the ratio between an atom derived from a cationic species and silicon is comprised between 1.6 and 2.25.

18. The method of claim 1, wherein a pH value of the reaction volume is between 11 and 14.

* * * * *